Jan. 8, 1957  F. KOCKS  2,777,048
CLAMPING DEVICE FOR BUTT-WELDING OF PIPES
Filed Nov. 15, 1955  2 Sheets-Sheet 2
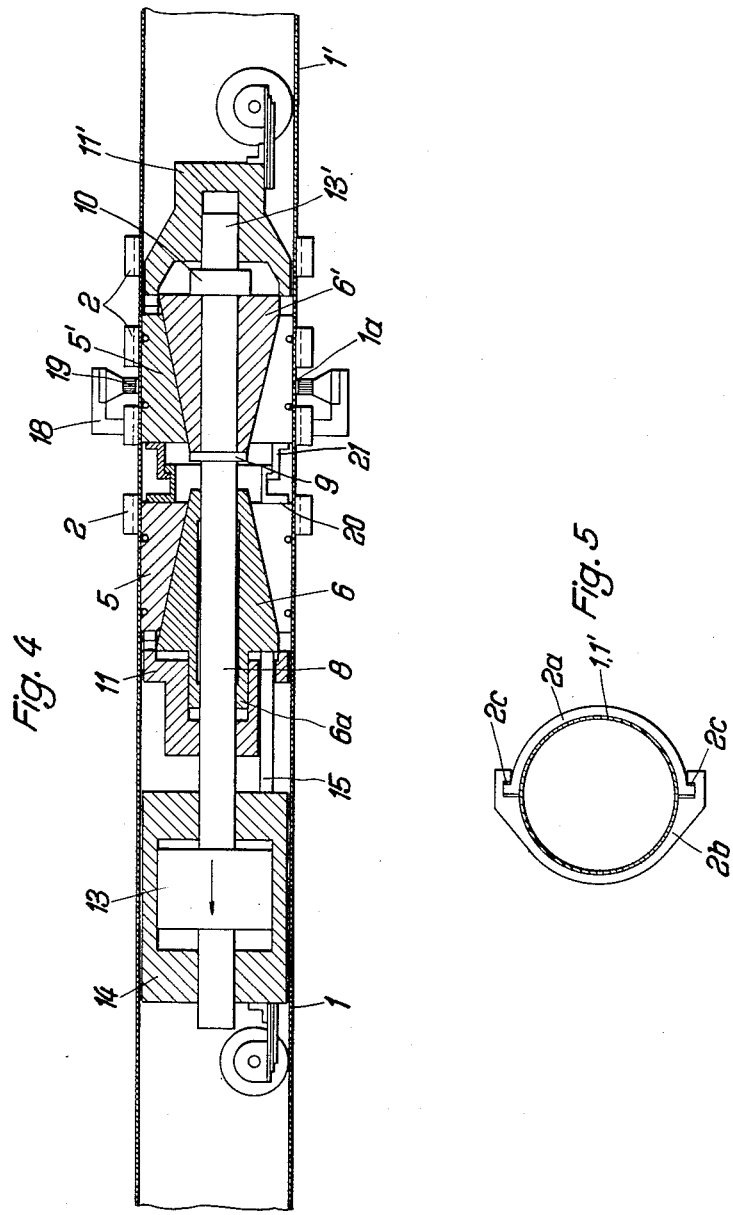
Inventor:

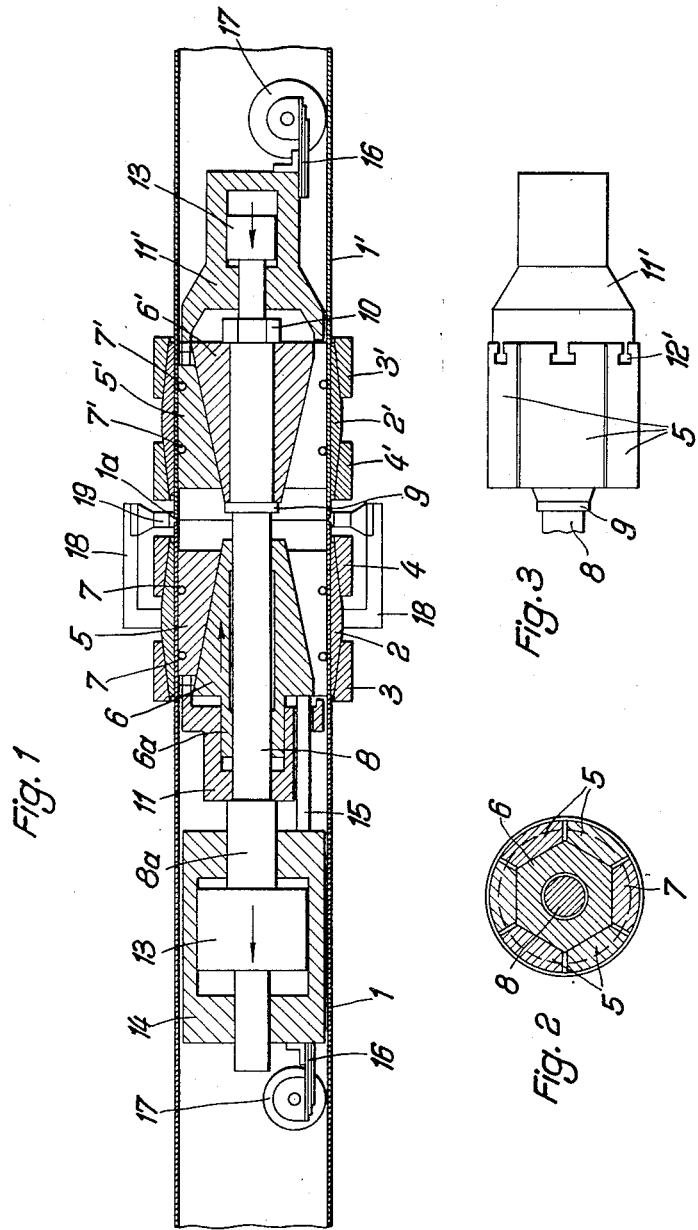

United States Patent Office 2,777,048
Patented Jan. 8, 1957

2,777,048

CLAMPING DEVICE FOR BUTT-WELDING OF PIPES

Friedrich Kocks, Wermelskirchen, Germany

Application November 15, 1955, Serial No. 546,864

Claims priority, application Germany December 4, 1954

3 Claims. (Cl. 219—161)

The present invention relates to a clamping device for butt-welding of pipes.

The butt-welding of pipes presents certain difficulties, first because the pipes are in most cases not perfectly round and their abutting ends consequently do not have an accurate fit. Furthermore, the pipes cannot be properly guided for axial alignment with the devices hitherto in use so that the necessary pressure for upsetting the pipe ends cannot be applied. Finally, heating of the pipe ends to be welded has to be limited to a short length in order to prevent the ends from denting or buckling when pressed together.

It is the object of the present invention to overcome the above mentioned disadvantages in butt-welding. This is done according to the invention by providing gripping means at the inside of each pipe end arranging the gripping members for axial guidance on a common piston rod; the necessary upsetting pressure is then applied by way of the piston rod on the pipe ends previously heated by induction to welding temperature.

The invention will now be more fully described with reference to the accompanying drawings in which two embodiments of the device are illustrated by way of example, but it should be understood that many changes can be made in the details without departing from the spirit of the invention.

In the drawings:

Fig. 1 is a longitudinal section through the clamping device;

Fig. 2 is a transverse section through the members for clamping the pipe ends;

Fig. 3 illustrates these clamping members in side elevation;

Fig. 4 is a longitudinal section through a different embodiment; and

Fig. 5 a cross-section through the outer support used in either one of the embodiments illustrated in Figs. 1 or 4.

The ends of two pipes 1, 1' are either turned in planar shape or obliquely. At each end the pipe is held by a sleeve 2, 2' (outer gripping members), chamfered with conically shaped ends which are clamped by cone-shaped annular members 3, 4, and 3', 4', respectively.

In the interior of pipes 1 and 1' a device is arranged near the sleeves 2 and 2' which is used for clamping the pipe ends. The clamping device comprises a number of wedge-shaped segments 5 and 5' and wedge bodies 6, 6'. The members 5, 5' are held together by springs 7 and 7'. The bodies 6 and 6' rest on a common piston rod 8. The body 6 is longitudinally slideable on rod 8, while 6' is secured immovably on the rod between a collar 9 and a nut 10.

Members 5' are attached to a cylinder 11' by means of dovetailed projections 12', and members 5 are attached in a similar manner to a cylinder 11, which bears against a portion 8a forming an elongation part of rod 8 and having a larger diameter. In cylinder 11' a piston 13' attached to rod 8 is slideably arranged. In cylinder 11 a projection 6a of the wedge-shaped body 6 is received for sliding movement. Another piston 13 is arranged on the elongated portion 8a of rod 8 which is slideable in a cylinder 14. This cylinder is secured to body 6 by means of a bolt 15. Cylinders 11' and 14 are mounted on a carriage 16 which is provided with wheels 17 and is movable in longitudinal direction. The sleeve 2 supports a frame 18 for a ring-shaped inductor 19.

In the device shown in Figs. 4 and 5, the outer clamping members 2, 2' are shown in the form of separated halves 2a, 2b, assembled by wedge-shaped projections 2c. One of these clamping members carries frame 18 for supporting the inductor 19. Two mutually engageable elements 20 and 21 provided on the segment-shaped wedges 5 and 5', respectively, prevent the movement of these wedges away from each other when in the illustrated position. In this embodiment, piston 13' which is guided in cylinder 11' acts in one direction only, and there is no elongation 8a of rod 8.

The butt-welding of pipes according to the invention is performed as follows:

First the pipe ends are gripped by sleeves 2, 2' and secured by the cone-shaped annular members 3, 4, and 3', 4', respectively. In the embodiment shown in Fig. 5 the securing is done by the two-part member 2a, 2b. Then the inner securing elements mounted on carriage 16 are passed into the pipes from one of the free ends, until the segment-shaped members 5, 5' are within the confines of sleeves 2, 2'. Piston 13' in cylinder 11' is then moved in the direction of the arrow until the parts surrounding the wedged body 6' are clamped, whereupon piston 6a is actuated in cylinder 11 in the opposite direction. At this time elements 2, 3, 4, and 5, as well as pipe 1 which surround body 6, will likewise be securely clamped. After thus having securely clamped the ends of both pipes 1 and 1', the abutting ends are heated to welding temperature by means of the ring-shaped conductor 19. Immediately thereafter pressure-welding takes place.

This is done by applying pressure on piston 13 in cylinder 14, in the direction of the arrow. Since cylinder 14 is rigidly connected with wedge body 6 of the clamping device, while rod 8 is axially slideable with respect to members 5 and 6, the end of pipe 1' is pulled towards the end of pipe 1, until butt-welding is completed. Thereupon piston 13 is relieved and cylinder 14 placed under pressure from the other side. Meanwhile pressure has also been released from cylinders 11 and 11' so that the parts of the clamping device become loosened.

In Fig. 4 the device is shown in a position in which the right-hand part of the clamping device has been moved below the butt-weld 1a previously accomplished. When, in this position pressure is brought to bear on piston 13' in cylinder 11', the red-hot welding seam may be pressed flat by means of wedge members 5' and 6'.

Otherwise the device according to Fig. 4 operates as follows:

First one set of the clamping parts, e. g. the right-hand parts in the interior of the device, are moved into pipe 1', whereupon the sleeves 2 are secured. The right-hand end of the pipe is then clamped by pressure admitted into cylinder 11' acting on piston 13' and by operating members 6', 5', and 2. In a similar manner securing of the left-hand pipe end is accomplished by pressure being applied in cylinder 11. Pressure acts in this part directly on piston 6a and members 6, 5, and 2. After the abutting ends have been heated to welding temperature by inductor 19 at 1a, pressure is admitted to cylinder 14 and applied to piston 13 in the direction of the arrow. Since rod 8 is slideable in body 6 and cylinder 14 is secured to this body by bolt 15, pulling of the end of pipe 1' toward the end of pipe 1 is again effected until such time as a butt-welding will have occurred, the two elements 20 and 21 sliding into each other simultaneously.

For separating the parts of the clamping device, pressure relief takes place in cylinders 11, 11', and 14 and then pressure is applied from the other side in cylinder 14 so that piston 13 will be moved contrary to the direction of the arrow until nut 10 bears against cylinder 11' and the wedge-shaped body 6' has become detached. Then the right-hand side of the device is released from clamping. The pressure which continues to act by way of nut 10 on cylinder 11' is capable of moving segments 5' in the direction contrary to the arrow. Elements 20 and 21 engage again at their ends and pull segments 5 away from body 6. The device is now free for moving the clamping parts out of the pipes.

What I claim is:

1. A clamping device for butt-welding of pipes, comprising a set of clamping members for introduction into each of a pair of pipes, each set including a cone-shaped body and a plurality of con-shaped segments cooperating with each body and forming therewith in assembled position a composite unit of a diameter equal to the pipe diameter, a common rod for mounting said body thereon in spaced relationship, one of said bodies being fixedly secured on said rod and the other one being axially slidable thereon, a plurality of hydraulic cylinders for co-action with said clamping members and said rod by changing the relative distance between said clamping members and thereby moving them into and out of pipe-clamping position, respectively, and means outside of the pipes for heating the ends to welding temperature when in abutting position.

2. A clamping device according to claim 1 wherein the means for heating the abutting pipe ends to welding temperature consist of an inductor.

3. A clamping device according to claim 2 wherein each of said sets of clamping members comprises additional external annular elements surrounding the pipes to be butt-welded and co-acting with said composite units in gripping the pipes during the welding operation.

References Cited in the file of this patent

UNITED STATES PATENTS

| | | |
|---|---|---|
| 402,107 | Ries | Apr. 23, 1889 |
| 1,696,455 | Rupley | Dec. 25, 1928 |
| 1,872,241 | Burnish | Aug. 16, 1932 |
| 1,958,447 | Quartz et al. | May 15, 1934 |
| 2,344,939 | Bennett | Mar. 28, 1944 |
| 2,353,868 | Bisbee et al. | July 18, 1944 |

FOREIGN PATENTS

| | | |
|---|---|---|
| 367,095 | Germany | Oct. 21, 1921 |